though illustrated in the examples, is not intended to United States Patent Office 3,318,964
Patented May 9, 1967

3,318,964
PREPARATION OF NON-CONJUGATED DIOLEFINS
Allen K. Sparks, Des Plaines, Ill., assignor to Universal Oil Products Company, Des Plaines, Ill., a corporation of Delaware
No Drawing. Filed June 21, 1965, Ser. No. 465,720
5 Claims. (Cl. 260—666)

This invention relates to a process for the preparation of non-conjugated diolefins. More particularly, the invention is concerned with a multi-step process for preparing non-conjugated diolefins from paraffinic feed stocks.

The need for crude rubber, either natural or synthetic, has increased at a tremendous rate, due to the extended use of said rubber and its position of great importance as a material of modern manufacture, said importance being due to a great extent to the diverse uses to which it may be put. Heretofore, in past years, the amount of rubber which may be obtained from natural sources, such as rubber trees, has been sufficient to satisfy the requirements of modern living. However, these sources of natural rubber may be made unobtainable to many countries which depend upon rubber due to emergencies which may arise. This condition was made apparent during World War II when many sources of natural rubber in the Far East, such as Southeast Asia, were cut off from the Western Hemisphere and certain countries in Europe. When situations such as this arise, substitutes must be found to take the place of the missing natural rubber. In previous years, certain synthetic rubbers such as the types produced by the reaction of butadiene and styrene (GR-S), butadiene and acrylonitrile (buna-N), butadiene and isobutylene, Thiokol rubber, silicone rubber, neoprene rubber, etc., have been prepared. However, these products have usually been inferior to natural rubber in many of the necessary properties when in the vulcanized elastic states. Therefore, the chemical industry is constantly attempting to overcome the shortcomings of synthetic rubbers by preparing new synthetic rubbers which will possess the desired physical characteristics. A specific example of this constant search for new products which has arisen in the past few years is the polymerization of isoprene in a stereoselective manner to produce a rubber product similar in many respects to the natural Hevea type rubber. Furthermore, an even more recent discovery has been a rubber known as EP terpolymer rubber which is a three-component compound comprising ethylene, propylene and a third monomer, the latter compound comprising a non-conjugated diolefinic compound.

The uses of rubber in articles of manufacture are of necessity many and varied, being too numerous to list in their entirety. A few representative uses are, for example, the use of raw rubber in the shoe industry for the production of crepe soles for shoes; for erasers, adhesive cements and in the fabrication of gummed fabrics such as, for example, rubber cloaks; for vulcanized rubber products which will include bumpers, buffers, vehicle tires, shockproof and soundproof articles, rubber bands, stoppers, stamps, sponges, elastic thread, belts, packing materials for machine construction, installation, etc.; and hard rubber which may be used as suitable material for combs, tubing, fountain pens, etc. It will be noted from the above list that each type of rubber must possess different physical characteristics. In this respect, the so-called EP terpolymer rubbers which, as hereinbefore set forth, have recently made an appearance in industry, have been found to possess certain physical characteristics which make them extremely useful as gaskets, seals, windshield wipers or as molded products, the finished article possessing a superior life and ability to retain its shape when compared to certain other rubber compounds. EP terpolymer, when properly vulcanized, built, and reinforced, likewise makes excellent vehicle tires having especially good non-skid properties and ozone resistance. It is believed that the requirements for certain rubbers and particularly EP terpolymer rubbers will be greatly increased due to the wider use of these compounds.

It is therefore an object of this invention to provide a process for the preparation of non-conjugated diolefinic hydrocarbons.

Another object of this invention is to provide a process for preparing non-conjugated diolefinic hydrocarbons which are useful as monomers in the preparation of EP terpolymer rubber.

In a broad aspect, one embodiment of this invention resides in a process for the preparation of a non-conjugated diolefinic hydrocarbon which comprises halogenating a paraffinic hydrocarbon with a halogenating agent at halogenation conditions, dehydrohalogenating the resultant dihalogenated hydrocarbons at dehydrohalogenation conditions, contacting the diolefinic hydrocarbons with a dienophile to remove conjugated diolefins, and recovering the non-conjugated diolefinic hydrocarbons.

A further embodiment of this invention is found in a process for the preparation of a non-conjugated diolefinic hydrocarbon which comprises halogenating a paraffinic hydrocarbon with a halogenating agent, said halogen being present in a mole ratio of from about 0.5 to about 1.25 moles of halogen per mole of hydrocarbon at a temperature in the range of from about ambient to about 500° C. and at a pressure in the range of from about atmospheric to about 50 atmospheres, dehydrohalogenating the resultant dihalogenated hydrocarbons at a temperature in the range of from about 250° to about 500° C., contacting the diolefinic hydrocarbons with a dienophile at a temperature in the range of from ambient to about 150° C. to remove conjugated diolefins and recovering the non-conjugated diolefinic hydrocarbons.

A specific embodiment of this invention is found in a process for the preparation of a non-conjugated diolefinic hydrocarbon which comprises treating 1,4-dimethylcyclohexane with bromine, said bromine being present in a mole ratio of from about 0.5 to about 1.25 moles of bromine per mole of 1,4-dimethylcyclohexane, at a temperature in the range of from about 50° to about 500° C. and at a pressure of from about atmospheric to about 50 atmospheres, dehydrobrominating the resultant dibromo-1,4-dimethylcyclohexanes at a temperature in the range of from about 250° to about 500° C. in the presence of ferric bromide, contacting the resultant dimethylcyclohexadienes with maleic anhydride, at a temperature in the range of from about ambient to about 250° C. to remove 1,4-dimethyl-1,3-cyclohexadiene, and recovering 1,4 - dimethylenecyclohexane, 1 - methyl-4-methylene-1-cyclohexene and 1,4-dimethyl-1,4-cyclohexadiene.

Other objects and embodiments will be found in the following further detailed description of this invention.

The present invention is concerned with a process for obtaining non-conjugated diolefinic hydrocarbons from a paraffinic hydrocarbon feed stock. As was hereinbefore set forth, the compounds which are useful as terpolymers will comprise a non-conjugated diolefinic hydrocarbon, the conjugated hydrocarbons not possessing the effectiveness as an element of the finished rubbery product. In particular, a non-conjugated diolefinic hydrocarbon which is cyclic in nature will provide a particularly effective terpolymer inasmuch as, if, for some reason a double bond in the cyclic ring is broken, the molecular chain which forms an integral part of the polymer will not be broken but will remain intact and therefore will provide added durable physical properties or qualities to the polymeric rubber.

Paraffinic hydrocarbons which will comprise the feed stock in the process of this invention will include straight-chain or cyclic paraffins, preferably containing from about 5 to about 30 carbon atoms in length. Some specific examples of these paraffins will include n-pentane, n-hexane, n-heptane, n-octane, n-nonane, n-decene, n-undecene, n-dodecene, n-tridecene, n-tetradecene, eicosane, tricontane, etc.; 2-methylpentane, 2-methylhexane, 2-methylheptane, 2-methyloctane, 2,5-dimethylhexane, 2,6-dimethylheptane, 2,-dimethyloctane, 2,3-dimethylnonane, 2,9-dimethyldecane, 3-ethylhexane, 3-ethylheptane, 3-ethyloctane, etc.; cyclopentane, cyclohexane, cycloheptane, methylcyclohexane, methylcycloheptane, 1,4-dimethylcyclohexane, 1,4-dimethylcycloheptane, etc. It is to be understood that the aforementioned paraffins, both straight-chain and branched-chain as well as cyclic in configuration are only representative of the class of compounds which may be utilized as starting materials and that the present invention is not necessarily limited hereto.

The initial step in the process of this invention comprises halogenating the aforementioned paraffinic hydrocarbons. In the preferred embodiment of this invention, the halogenation is effected by treating said paraffinic hydrocarbon with a halogenating agent at halogenation conditions. The preferred halogenating agents of this invention comprise elemental bromine and elemental chlorine although it is contemplated within the scope of this invention that elemental iodine may also be utilized, although not necessarily with equivalent results. The halogenation conditions which are used in the process of this invention will include temperatures ranging from ambient (about 25° C.) up to about 500° C. and pressures ranging from atmospheric to about 50 atmospheres or more. The halogenation of the paraffinic hydrocarbon is accomplished in either a thermal or photolytic manner and furthermore can be effected in either a liquid or vaporous state. When halogenating the paraffinic hydrocarbons, the halogenating agent will usually be present in a mole ratio within the range of from about 0.5 to about 1.25 moles of halogen per mole of paraffinic hydrocarbon to be halogenated. The resulting halogenated paraffinic hydrocarbon will comprise a mixture of mono-halo paraffins and polyhalo paraffins, the latter including some geminal dihalo paraffins, vicinal dihalo paraffins and other dihalo paraffins. It is contemplated within the scope of this invention that the monohalo paraffins may be separated along with the unreacted hydrocarbons from the polyhalo paraffins and recycled to the halogenation zone where said compounds will undergo further halogenation thus prepare the desired polyhalo paraffins.

As hereinbefore set forth, the halogenation of the paraffinic hydrocarbons will result in the obtention of a mixture of polyhalo paraffins including geminal, vicinal and other dihalo paraffins. When this mixture of dihalo paraffins is dehydrohalogenated, the product resulting from the dehydrohalogenation of geminal dihalo paraffins will be an acetylene or 1,2-diolefin the resulting product from the dehydrohalogenation of a vicinal dihalo paraffin will be a 1,2- or 1,3- (conjugated) diolefin while the product resulting from the dehydrohalogenation from the other dihalo paraffins will be mainly non-conjugated diolefins. The dehydrohalogenation of the polyhalo paraffins will be effected at elevated temperatures ranging from about 250° to about 500° C. or more. In the preferred embodiment atmospheric pressure is utilized in the reaction although it is also contemplated that subatmospheric or superatmospheric pressures may be used if so desired. The dehydrohalogenation may be effected in a thermal manner in the presence of glass beads or in the presence of metal halides such as ferric bromide on a suitable support, calcium bromide on a suitable support, etc.

Following the dehydrohalogenation of the polyhalo paraffins, the resulting mixture of diolefins will comprise a mixture of conjugated and non-conjugated hydrocarbons, the latter being as hereinbefore set forth, the preferred products of the invention. Inasmuch as the usual products resulting from the halogenation of the straight-chain and cyclic paraffins will comprise mainly vicinal and other polyhalo paraffins with a relatively minor amount of geminal dihalo paraffins, the acetylenes which are formed by the dehydrohalogenation of the geminal dihalo paraffins will be present in negligible amounts. The desired products of the invention are then recovered by separating the conjugated diolefins and non-conjugated diolefins, said separation being effected by treating the mixture with a dienophile. Examples of these dienophiles which may be used include acrylic acid, maleic acid, maleic anhydride, etc. After contacting the mixture with the dienophile, the adduct of the conjugated diolefin and the dienophile is removed by caustic extraction and the remaining non-conjugated diolefins are separated and recovered by conventional means. The removal of the conjugated diolefinic hydrocarbons being contacted with the dienophile is effected at temperatures ranging from ambient (about 25° C.) up to about 250° C. or more and usually at atmospheric pressure although superatmospheric pressures ranging to about 50 atmospheres may also be used, if so desired. It is contemplated within the scope of this invention that the resulting adduct of the conjugated diolefin and the dienophile may be subsequently cracked and the dienophile recovered and recycled for further use. Examples of non-conjugated diolefinic hydrocarbons which may be prepared according to the process of this invention include 1,4-pentadiene, 1,5-hexadiene, 1,4-heptadiene, 1,5-heptadiene, 1,6-heptadiene, 1,4-octadiene, 1,5-octadiene, 1,7-octadiene, 1,4-nonadiene, 1,6-nonadiene, 1,8-nonadiene, 1,4-decadiene, 1,9-decadiene, etc.; 2-methyl-1,4-hexadiene, 2-methyl-1,5-hexadiene, 2,5-dimethyl-1,4-hexadiene, 2,5-dimethyl-1,5-hexadiene, 2-methyl-1,4-heptadiene, 2-methyl-1,6-heptadiene, 2,6-dimethyl-1,6-heptadiene, 2-methyl-1,4-octadiene, 2,6-dimethyl-1,7-octadiene, etc.; 4-methylene-1-cyclohexene, 1-methyl-1,4-cyclohexadiene, 1-methyl-4-methylene-1-cyclohexene, 1,4-dimethylenecyclohexane, 1,4-dimethyl-1,4-cyclohexadiene, etc. It is to be understood that the aforementioned diolefinic hydrocarbons are only representative of the class of compounds which may be prepared and that the present invention is not necessarily limited thereto.

The process of the present invention may be effected in any suitable manner and may comprise either a batch or continuous type operation. For example, if a batch type operation is used, a quantity of the starting material comprising a paraffinic hydrocarbon either straight-chain, branched-chain or cyclic in configuration is placed in an appropriate apparatus. The halogenating agent is charged thereto in either liquid or gaseous form. Thereafter the apparatus is heated to the desired reaction temperature. Upon completion of the desired residence time, which may range from about 0.5 to about 10 hours or more, heating is discontinued, following which the apparatus and contents thereof are allowed to cool to room temperature. The halogenated hydrocarbons are recovered and separated from any unreacted paraffinic hydrocarbons. In addition to the separation of unreacted hydrocarbons, the monohalo hydrocarbons are also separated and may be utilized as a portion of the feed stock at a subsequent reaction.

The polyhalo hydrocarbons containing geminal, vicinal and other configurations are then continuously charged to a dehydrohalogenating apparatus which contains glass beads or a dehydrohalogenation catalyst such as ferric bromide or calcium bromide on a suitable support, etc. The apparatus is maintained at a temperature of between 250° and 500° C., the polyhalo hydrocarbons being passed over the catalyst bed for a predetermined residence time which ranges from 5 seconds to a minute or more. The dehydrohalogenated hydrocarbons which comprise a mixture of conjugated and non-conjugated diolefinic hydrocarbons with a negligible amount of acetylenes, allenes and polyolefins (said polyolefins being trienes, etc.) are recovered. These diolefinic hydrocarbons are then placed in yet another apparatus where they are contacted with a dienophile such as maleic anhydride, maleic acid, etc., in a Diels-Alder manner, the reaction temperature ranging from ambient up to about 150° C. At the end of the desired residence time, as in the previous steps, the adducts of the dienophile and the conjugated diolefins are separated from the non-conjugated diolefinic hydrocarbons by conventional means such as fractional distillation, crystallization, caustic extraction, etc.

It is also contemplated within the scope of this invention that the process described herein may be effected in a continuous manner of operation. When such a type of operation is used, a quantity of the paraffinic hydrocarbon is continuously charged to a reaction zone which is maintained at the proper operation conditions of temperature and pressure. In addition, the halogenating agent, preferably elemental bromine or chorine, is also continuously charged to the reaction zone through a separate line, the quantities of reactants being such that the halogenating agent is present in the reaction mixture in a mole ratio with the range of from about 0.5 to about 1.25 moles of halogen per mole of hydrocarbon. If so desired, the halogenating agent and the paraffinic hydrocarbon, either straight-chain or cyclic in configuration, may be admixed prior to entry to said reaction zone and charged thereto in a single stream. After a predetermined residence time has elapsed, the reaction product is continuously withdrawn from the reaction zone and subjected to a separation step such as fractional distillation wherein the unreacted hydrocarbons or monohalo hydrocarbons are separated from the polyhalo hydrocarbons and recycled to form a portion of the feed stock. The polyhalo hydrocarbons are then continuously charged to a dehydrohalogenation zone which is also maintained at the proper operation conditions of temperature and pressure. In addition, the dehydrohalogenation zone will contain a dehydrohalogenation agent such as ferric bromide, calcium bromide, glass beads, etc. After a predetermined residence time of the duration hereinbefore set forth in greater detail has elapsed, the mixture of diolefinic hydrocarbons containing a negligible amount of acetylenes is continuously withdrawn from the reaction zone and passed to a third reaction zone. This third reaction zone, as in the case of the previous two is also maintained at the proper operating conditions of temperature and pressure. The dienophilic compound such as maleic acid, maleic anhydride, etc., is continuously charged to the reaction zone wherein the conjugated diolefins are reacted with the dienophile in a Diels-Alder manner. The reactor effluent is continuously withdrawn and passed to a separation zone wherein the aforementioned adduct is separated from the non-conjugated diolefinic hydrocarbons, the latter being passed to storage, while the former if so desired, may be cracked to recover the dienophile which can be reused in the third reaction zone.

The following examples are given to illustrate the process of the present invention which, however, are not intended to limit the generally broad scope of the present invention in strict accordance therewith.

Example I

In this example, 84 g. (1.0 mole) of cyclohexane is placed in a flask. Following this, 80 g. (0.5 mole) of bromine is added thereto and the flask and contents thereof are then heated to a temperature of about 100° C., being maintained at this temperature for a period of about 4 hours. At the end of this time, the flask and contents thereof are allowed to cool to room temperature. The polybromocyclohexanes are separated from bromocyclohexane and charged to a reaction zone containing ferric bromide composited on a suitable support. The apparatus and contents thereof are maintained at a temperature of about 300° C. while the polybromocyclohexanes are charged thereto at such a rate so that the residence time during which said cyclohexanes are in contact with the catalyst ranges from about 5 seconds up to one minute. At the end of this time, the mixture of diolefinic hydrocarbons is withdrawn and separated from the hydrogen bromide which is formed. The aforementioned mixture of diolefinic hydrocarbons comprising 1,3-cyclohexadiene and 1,4-cyclohexadiene is treated with maleic anhydride in a condensation flask and is heated to a temperature of about 50° C. At the end of this time, the flask and contents thereof are cooled to room temperature and the 1,4-cyclohexadiene is separated from the adduct of maleic anhydride and 1,3-cyclohexadiene by extraction with caustic.

Example II

In this example, 114 g. (1.0 mole) of 1,4-dimethylcyclohexane is placed in a reaction flask and 80 g. (0.5 mole) of bromine is added thereto. The flask is heated to a temperature of about 150° C. for a period of about 4 hours. At the end of this time, the flask and contents thereof are allowed to cool to room temperature and the polybromodimethylcyclohexanes are separated from the monobromodimethylcyclohexanes and unreacted 1,4-dimethylcyclohexane. The mixture of polybromo-1,4-dimethylcyclohexanes is then charged to an apparatus containing a small amount of ferric bromide composited on a suitable support. The apparatus is then maintained at a temperature of about 300° C., while the contact time between the catalyst and polybromo-1,4-dimethylcyclohexanes is about 30 seconds. The hydrogenbromide which is formed during the reaction is separated from the mixture of diolefinic hydrocarbons which are formed during this step of the process. Following this the mixture of diolefinic hydrocarbons is treated with maleic anhydride in a condensation flask at a temperature of about 50° C. At the end of the residence time, about 3 hours, the adduct of 1,4-dimethyl-1,3-cyclohexadiene and maleic anhydride is separated by caustic extraction from the desired 1,4-dimethylenecyclohexane, 1-methyl-4-methylene-1-cyclohexene and 1,4-dimethyl-1,4-cyclohexadiene.

Example III

Into the glass liner of a rotating autoclave is placed 114 g. (1.0 mole) of 2,5-dimethylhexane. The liner is sealed into the autoclave and chlorine is added until about 1 mole of chlorine has been charged thereto. The autoclave is then heated to a temperature of about 250° C. and maintained thereat for a period of about 4 hours. At the end of this time, the autoclave and contents thereof are allowed to cool to room temperature and the excess pressure is vented. The polychlorohexanes are separated from the monochlorohexanes and unreacted 2,5-dimethylhexane by fractional distillation and placed in an apparatus similar to that described in Examples I and II above, said apparatus containing ferric chloride. The polychlorohexanes are dehydrochlorinated at a temperature of about 400° C., after which the hydrogen chloride which forms during the reaction is separated from the mixture of diolefinic hydrocarbons. After cooling, the resultant mixture of diolefinic hydrocarbons is treated with maleic anhydride at a temperature of about 100° C. The desired 2,5-dimethyl-1,4-hexadiene and 2,5-dimethyl-1,5-hexadiene are separated from the adduct of maleic anhydride and 2,5-dimethyl-2,4-hexadiene by caustic extraction.

Example IV

In a similar manner to the reactions hereinbefore set forth, 86 g. (1.0 mole) of n-hexane is treated with 0.5 mole of chlorine at a temperature of about 250° C. in a rotating autoclave. The resultant mixture of dichloroexanes, monochlorohexanes and unreacted hexane are separated by fractional distillation, following which the polychlorohexanes are charged to an apparatus containing ferric chloride. The apparatus is maintained at a temperature of about 400° C. while the polychlorohexanes are being dehydrochlorinated, the contact time being about 30 seconds. The hydrogen chloride which is formed during the reaction is separated from the mixture of isomeric hexadienes after which the mixture of isomeric hexadienes is treated with maleic anhydride at a temperature of about 100° C. The adducts of maleic anhydride with 1,3-hexadiene and 2,4-hexadiene are separated from the desired 1,4-hexadiene and 1,5-hexadiene by extraction, the latter two compounds being recovered.

*Example V*

In this example, methylcyclohexane in an amount of 99 g. (1.0 mole) is treated with 80 g. (0.5 mole) of bromine in a reaction flask at a temperature of about 250° C. for a period of 4 hours. At the end of this time, the flask and contents thereof are cooled to room temperature and the dibromomethylcyclohexanes are separated from the monobromomethylcyclohexanes and unreacted methylcyclohexane by fractional distillation. Following this, the polybromomethylcyclohexanes are charged to a reaction apparatus containing Pyrex glass beads which is maintained at a temperature of about 400° C., the contact time between the beads and polybromomethylcyclohexanes being for a period of about 30 seconds. The hydrogen bromide which is formed during the reaction is separated from the isomeric methylcyclohexadienes following which the mixture of methylcyclohexadienes is treated with maleic anhydride at a temperature of about 100° C. The adducts of maleic anhydride and 3-methylene-1-cyclohexene, 2-methyl-1,3-cyclohexadiene and 1-methyl-1,3-cyclohexadiene are separated from the desired 4-methylene-1-cyclohexane and 1-methyl-1,4-cyclohexadiene by caustic extraction, the latter two compounds being recovered for further use.

I claim as my invention:

1. A method for separating a conjugated diolefin from a mixture thereof with a non-conjugated diolefin which comprises treating the mixture with a dienophile selected from the group consisting of acrylic acid, maleic acid and maleic anhydride at a temperature of from about 25° C. to about 250° C. to react the dienophile with the conjugated diolefin, separating the resultant adduct from the unreacted non-conjugated diolefin and recovering the latter.

2. A method for separating a conjugated diolefin from a mixture thereof with a non-conjugated diolefin which comprises treating the mixture with maleic anhydride at a temperature of from about 25° C. to about 250° C. to react the maleic anhydride with the conjugated diolefin, separating the resultant adduct from the unreacted non-conjugated diolefin and recovering the latter.

3. The method of claim 2 further characterized in that said mixture comprises cyclohexadienes.

4. The method of claim 2 further characterized in that said mixture comprises dimethylcyclohexadienes.

5. The method of claim 2 further characterized in that said mixture comprises hexadienes.

References Cited by the Examiner

UNITED STATES PATENTS

| | | | |
|---|---|---|---|
| 2,104,956 | 1/1938 | Stern | 260—681.5 |
| 2,139,773 | 12/1938 | Rosen et al. | 260—681.5 |
| 2,357,910 | 9/1944 | Robey et al. | 260—681.5 |
| 2,389,144 | 11/1945 | Evans et al. | 260—681.5 |
| 3,246,043 | 4/1966 | De Rosset et al. | 260—666 |

DELBERT E. GANTZ, *Primary Examiner.*

V. O'KEEFE, *Assistant Examiner.*